(12) United States Patent
Rusch (10) Patent No.: US 8,734,066 B2
(45) Date of Patent: May 27, 2014

(54) HOLE SAW TUBE NOTCHER (76) Inventor: Christopher J. Rusch, Two Rivers, WI (US)

( * ) Notice: Subject to any disclaimer, the term of this patent is extended or adjusted under 35 U.S.C. 154(b) by 539 days.

(21) Appl. No.: 13/065,491

(22) Filed: Mar. 23, 2011

(65) Prior Publication Data

US 2012/0243954 A1 Sep. 27, 2012

(51) Int. Cl.
*B23B 47/28* (2006.01)

(52) U.S. Cl.
USPC .......... 408/106; 408/89; 408/110; 408/115 R; 279/107; 279/114; 29/281.1; 29/243.56

(58) Field of Classification Search
USPC ................. 408/110, 111, 106, 115 R, 89, 54; 279/106, 107, 114, 35; 82/113; 269/289 R, 43, 45, 71; 29/281.1, 29/243.56
See application file for complete search history.

(56) References Cited

U.S. PATENT DOCUMENTS

| | | | |
|---|---|---|---|
| 253,913 A | 2/1882 | Davis | |
| 942,389 A | 12/1909 | Wiggins | |
| 949,031 A * | 2/1910 | Borden | 279/114 |
| 2,484,758 A | 10/1949 | Sonnie | |
| 2,622,458 A | 12/1952 | Jenkins | |
| 2,746,125 A * | 5/1956 | Cuny | 83/466 |
| 2,849,900 A | 9/1958 | Heidtman, Jr. | |
| 2,909,083 A | 10/1959 | Chestnut | |
| 3,119,286 A * | 1/1964 | Forman et al. | 408/110 |
| 3,263,544 A | 8/1966 | Margolien | |
| 3,288,183 A | 11/1966 | Eisbrenner | |
| 3,420,124 A | 1/1969 | Trevathan | |
| 3,626,513 A | 12/1971 | Pytlak | |
| 3,890,058 A | 6/1975 | Self et al. | |
| 3,995,869 A * | 12/1976 | Mazingue | 279/33 |
| 4,152,090 A | 5/1979 | Harris et al. | |
| 4,391,558 A | 7/1983 | Perry | |
| 4,729,698 A | 3/1988 | Haddon | |
| 4,865,496 A | 9/1989 | Challis | |
| 5,150,993 A | 9/1992 | Miller | |
| 5,797,708 A | 8/1998 | Bencic | |
| D474,093 S | 5/2003 | Chang | |
| 7,607,870 B2 | 10/2009 | Hughes, Jr. | |
| 8,152,419 B1 * | 4/2012 | Snyder | 408/105 |
| 2009/0022559 A1 * | 1/2009 | Hughes, Jr. | 408/103 |

FOREIGN PATENT DOCUMENTS

| | | |
|---|---|---|
| CH | 310900 | 1/1956 |
| DE | 19514979 | 11/1995 |
| EP | 100421 | 2/1984 |
| JP | 60141417 | 7/1985 |
| JP | 03294104 | 12/1991 |

* cited by examiner

*Primary Examiner* — Eric A Gates
*Assistant Examiner* — Chwen-Wei Su
(74) *Attorney, Agent, or Firm* — Jeffrey S. Sokol; Sokol Law Office (57) ABSTRACT

The present is a hole saw tube notcher with a rotary vice that aligns a tubular workpiece and a hole saw aligning assembly with a rotatable arm that aligns a hole saw to form a single or multiple cut notch geometry with a set radial middle that remains fixed when the rotary arm is rotated and when different diameter workpieces and hole saws are secured to the notcher.

17 Claims, 10 Drawing Sheets

HOLE SAW TUBE NOTCHER

TECHNICAL FIELD OF THE INVENTION

The present invention relates to a hole saw tube notcher with a rotary vice that aligns a tubular workpiece centerline, and a rotating alignment assembly that aligns a hole saw centerline with the workpiece centerline, where the alignment assembly has an axis of rotation that intersects the workpiece centerline and the hole saw centerline at a fixed point a set distance in front of the vice, and where the fixed point remains on the radial middle of the notch independent of the rotational setting of the rotary arm and independent of the workpiece diameter or the hole saw diameter.

BACKGROUND OF THE INVENTION

Many modern buildings and products utilize interconnected pipes, tubes and rod. Buildings frequently use metal tubes to form handrails, bicycle racks and other fixtures. These handrails are formed by a variety of different diameter tubes as shown in FIG. 1 of U.S. Pat. No. 6,435,783. The end of one tube is joined to the sidewall of another. The ends of the tubes are notched to form a smooth joint where one tube is welded or otherwise secured to another. Chemical and food processing plants incorporate elaborate metal and PVC piping systems to efficiently move and dispense fluids throughout the plant as shown in FIG. 2 of U.S. Pat. No. 6,435,783. One pipe or tube can have a hole drilled in its sidewall, with another pipe or tube being angled so that the fluid in the pipe will smoothly flow into the other. The end of the pipe is notched to flushly mate against the sidewall of the other to help achieve this smooth fluid flow. Manufacturing plants produce a wide variety of consumer products formed from interconnected tubes, such as lawn furniture, play ground equipment, bicycle and motor cycle frames, automobile chassis, airplane fuselages, exhaust manifolds, scaffolding and crane booms.

To assemble these building fixtures, piping systems and consumer products, a number of tubes, pipes, rods or other types of workpieces are cut to their appropriate length, and if necessary, bent into a desired shape. A notching machine is then used to cut or otherwise form a notch into one or both ends of each workpiece. These workpieces or component parts are then assembled to form the desired product. The notched end of one part smoothly mates with and is welded or otherwise joined to the sidewall of another part to form an integral fixture, pipe system or product. A variety of notching machines are used to form notches in plastic and metal pipes, tubes and rods. Two types of notching machine are the higher end drill bit type notching machines such as shown in U.S. Pat. No. 6,435,783 and the more economical hole saw tube notchers shown in U.S. Pat. No. 7,607,870, the contents of which are incorporated by reference. These types of notchers include a conventional vice with a stationary plate and a parallel moving plate to hold the workpiece. The stationary plate can take the form of a V-shape to help align the workpiece with the hole saw.

One problem with conventional hole saw notchers is properly aligning a workpiece. When the conventional or V-notch vice is gripping the workpiece, the vice does not align the workpiece centerline with the axis of rotation of the hole saw. The operator must make complicated calculations to properly align the workpiece with the hole saw, or rely on guess work, both of which result in malformed notches, and excessive and costly rework time and scrap.

Another problem with conventional hole saw tube notchers is forming a notch when the hole saw is too short. The length of a given a hole saw may be too short to pass completely through a workpiece, particularly for larger diameter workpieces. When this occurs, the operator must position the workpiece once to from a first partial notch in the workpiece. Then, rotate and realign the workpiece to cut through the opposite side of the workpiece to complete the notch. Not only is this time consuming, the need to reposition or realign the workpiece results in misalignment that produces a abnormality in the finished notch.

A further problem with conventional hole saw tube notchers is their inefficiency forming a multi-angled notch. Again, the operator has to reposition or realign the workpiece for each notch portion of the multi-angled notch.

A still further problem with conventional hole saw tube notchers is their inefficiency when the diameter of the workpiece or hole saw changes. For notching machines using a conventional fixed plate vice, each time a different diameter hole saw is used, the operator has to realign the workpiece with hole saw. The same situation arises each time a different diameter workpiece is secured to the notcher. Yet, a single handrail, piping system, or product may require a variety of different diameter tubes, pipes or rods that must be notched to suit a particular joint geometry. This problem is compounded by the fact that construction sites and manufacturing plants frequently have several different projects or product runs going simultaneously. One project may require several different tube diameters, notch sizes and shapes, and each notch may need to be finished by a grinding or polishing tool. Every time the diameter of the workpiece or hole saw changes, the operator must figure out the proper alignment of the workpiece with the hole saw.

A still further problem with conventional hole saw tube notchers is their inability or inefficiency in forming offset notches. Some less expensive notcher do not provide this feature, and other notchers require time consuming adjustment to produce an offset notch.

A still further problem with conventional hole saw tube notchers is their inability to rework a notch of a workpiece to achieve a better fit with a given structure. Notwithstanding the guesswork frequently used with conventional tube notchers, particularly for angled notches, these notchers tend to decreases the centerline length of the workpiece when reworking the notch, which prevents a quality fit, unattractive appearance, and may even reduce the strength of the finished structure.

A still further problem with conventional hole saw tube notchers is their bulky, heavy and awkward to pick up designs that render them difficult to transport.

The present invention is intended to solve these and other problems.

BRIEF DESCRIPTION OF THE INVENTION

The present invention relates to a hole saw tube notcher with a rotary vice, and a hole saw alignment assembly with a rotatable arm that rotates about an axis of rotation. The rotary vice firmly hold or grips and aligning a tubular workpiece so that the centerline of the workpiece intersects the axis of rotation, which is perpendicular to and located a set distance in front of the vice, so that the hole saw centerline is parallel to the workpiece centerline. The rotatable arm has an arbor that slidingly holds and aligns a hole saw. In a normal operating position, the centerline of the hole saw intersects the rotation axis of the arm and the centerline of the workpiece at a common point of intersection. In this normal position, the tube notcher forms full hemispherical notches in a workpiece with the same diameter as the hole saw. The hole saw alignment assembly can be lowered to an offset position where the centerline of the hole saw continues to intersect the arm rotation axis, but is offset down from the workpiece centerline. In this offset position, the notcher cuts offset notches into the workpiece. The tube notcher forms notches with a set radial middle on the centerline of the notch. The radial middle of the notch remains fixed when the rotatable arm is rotated to increase or decrease the angle of the notch. The radial middle or center of the notch even remains fixed when a different diameter hole saw is secured to the arbor, or a different diameter workpiece is secured to the vice.

One advantage of the present hole saw notchers is its workpiece alignment efficiency. When the rotary vice is gripping the workpiece, the vice automatically aligns the workpiece centerline with the axis of rotation of the rotating arm and the centerline of the hole saw. The operator need only consider the longitudinal orientation of the workpiece in the vice, which is simplified by the fact that the operator knows that the radial middle or center of the notch will pass through the arm axis of rotation. In fact, for many notch cuts, the operator can readily position the workpiece visually by looking straight down and aligning the desired radial middle of the cut with the center of a rotation dial.

Another advantage of the present hole saw notcher is its notch forming efficiency. The length of a given a hole saw may be too short to pass completely through a workpiece, particularly larger diameter workpieces. In this situation, the operator need only position the workpiece and hole saw once. Then, with the arm in a normal position to the workpiece, the operator makes a first partial notch through the workpiece. Then, without resetting the alignment of the workpiece or even rotating the workpiece, the operator simply swings the rotatable arm around 180° to finish the notch from the opposite side of the workpiece. Because the workpiece remained fixed during both cuts, the notch has a continuous finished appearance that is free from alignment errors.

A further advantage of the present hole saw notchers is its notch forming efficiency when forming a multi-angled notch. Again, the operator need only position the workpiece once. The rotatable arm is set to a first desired notch angle to form the first notch of the multi-angled notch. Then, without resetting the alignment of the workpiece, the operator swings the rotatable arm to a second desired notch angle to form a second notch. The multi-angled notch can have two, three, or even more notched angle potions without resetting or realigning the workpiece.

A still further advantage of the present hole saw notcher is its operating efficiency when changing the diameter of the workpieces or hole saws. The operator does not have to realign the workpiece with hole saw each time a different diameter hole saw is used. Similarly, the operator does not have to realign the workpiece with the hole saw each time a different diameter workpiece is secured to the tube notcher. The present tube notcher is particularly useful for constructing a handrail, piping system, or product that requires a variety of different diameter tubes, pipes or rods that must be notched to suit a particular joint geometry. The present notcher is also particularly useful at construction sites and manufacturing plants that frequently have several different projects or product runs going simultaneously, particularly when these projects require several different tube diameters, notch sizes and shapes, and each notch may need to be finished by a grinding or polishing tool.

A still further advantage of the present hole saw notcher is its ability to form an offset notch. By simply sliding the pivot block down in its alignment groove to a desired offset position, the operator can readily form an offset notch. This repositioning, does not alter the alignment of the workpiece centerline with the axis of rotation of the arm and hole saw. Moreover, the above noted operating efficiencies also apply to the forming of offset notches.

A still further advantage of the present hole saw notcher is its ability to rework a notch of a workpiece to achieve a better fit with a given structure. After a a workpiece is cut to a fixed length with one or two notched ends, should one of the notches not properly align with the structure, the workpiece can be resecured to the hole saw tube notcher to recut the angle of the notch a few degrees. Because the centerline of the hole saw passes through the radial middle of the notch, half of the notch can be shaved away to increase or decrease the angle of the notch without changing the centerline length of the workpiece. The ability to rework a notch, can help avoid unnecessary waist and achieve a more aesthetic or even stronger finished structure.

A still further advantage of the present hole saw tube notcher is its compact, portable and relatively lightweight construction. A simple base plate is used to secure the various components. The length of the rotatable arm is kept short by adding an offset slot. This offset slot allows higher angle cuts to be formed without increasing the length of the rotatable arm, or increasing the distance of the arm axis from the vice. The tube notcher has an overall weight of about 40 pounds, is easily transported, and can be either screwed onto a work bench or secured to a conventional opposed plate vice of the work bench. The tube notcher can be easily moved and set up at a location close to the component parts being notched.

Other aspects and advantages of the invention will become apparent upon making reference to the specification, claims and drawings.

DESCRIPTION OF THE PREFERRED EMBODIMENTS

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

The present invention relates to a machine for notching a workpiece 5 such as commercial grade tube or pipe. The tube 5 has a sidewall 6, and a length defined by its ends. The sidewall 6 has a circular cross sectional shape defined by its inside surface and outside surface 7. The inside and outside surfaces define the inside and outside diameters of the tube. The tube 5 has a longitudinal axis or centerline 8. The inside surface of the tube 5 defines an open interior 9. The tube 5 is preferably made of metal or plastic, but could be another solid cuttable materials. While the workpiece 5 is generally shown and described herein as being a tube, it should be understood that the workpiece could take other forms and shapes, such as pipe or a solid rod, without departing from the broad aspects of the invention.

Figure 1:
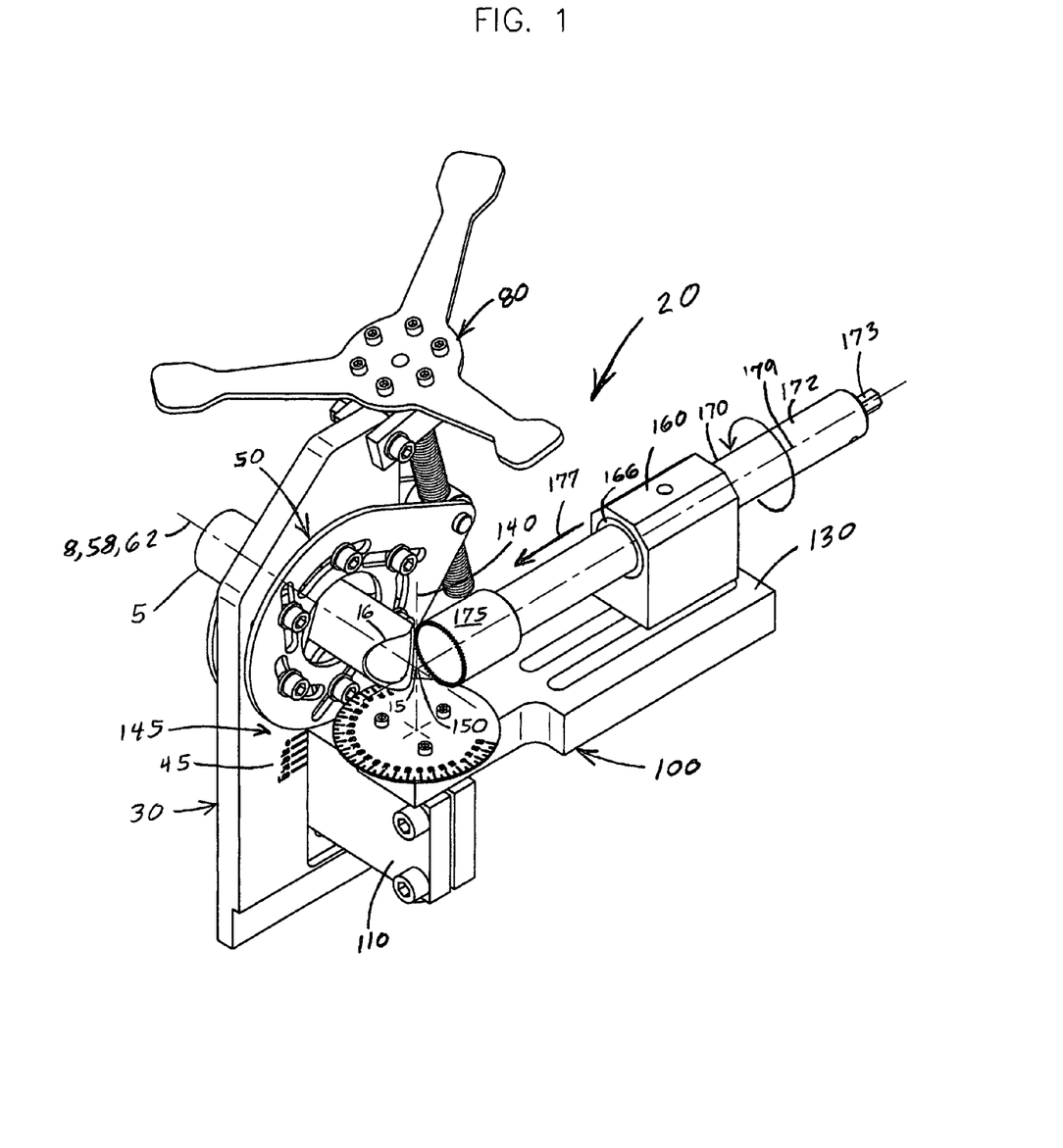
FIG. 1 is a perspective view of the present hole saw tube notcher in with the rotary vice holding a tubular workpiece, the hole saw alignment assembly slidably holding a hole saw, and with the pivot block in a normal operating position so that the axis of rotation of the rotatable arm, workpiece centerline and saw centerline align to intersect at a fixed point a set distance in front of the vice.
Figures 8, 8A:
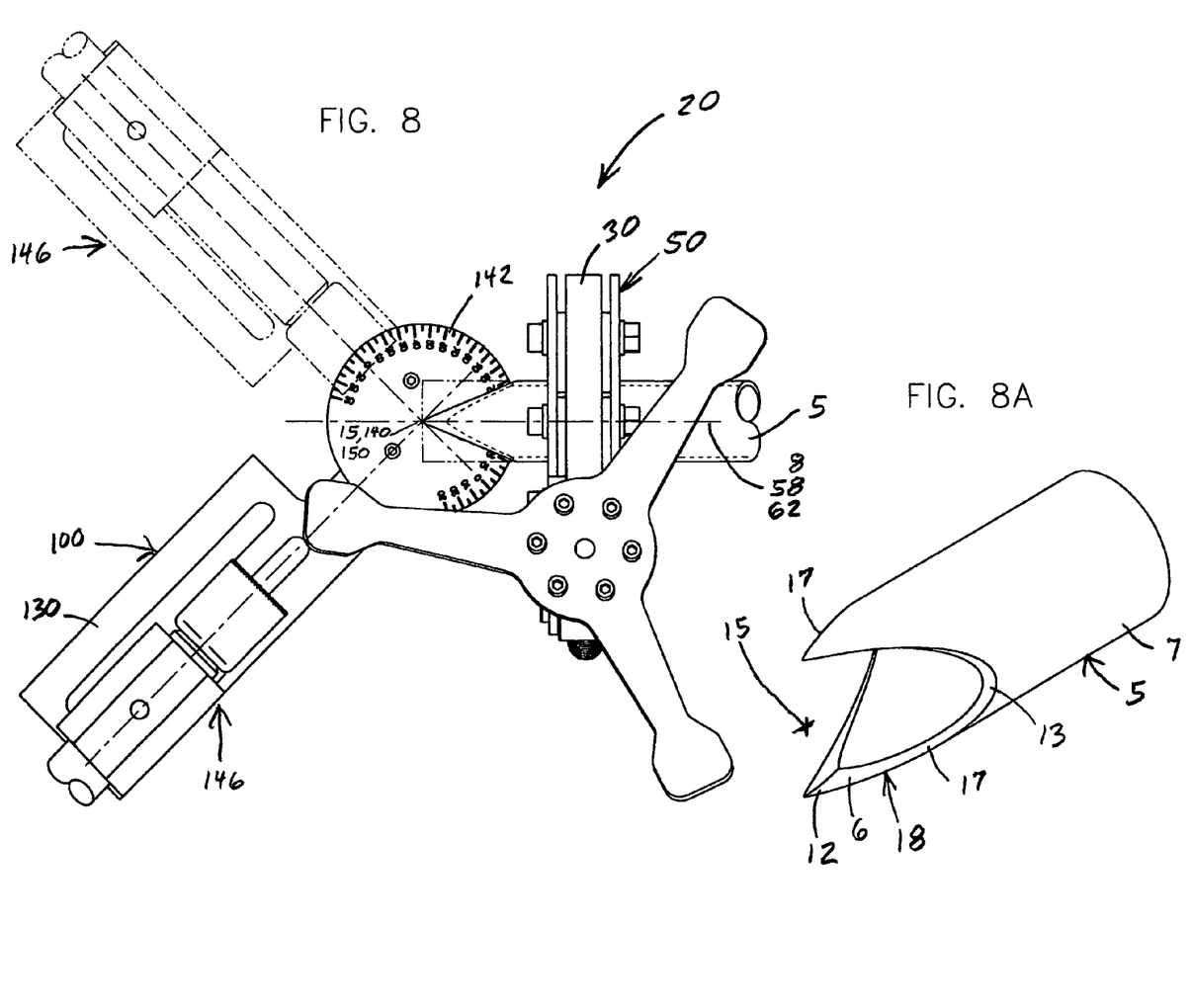
FIG. 8 is a top view of the hole saw tube notcher with the rotatable arm rotated to form a 45° angle notch and a 135° angle notch to show that the fixed point remains on the radial midpoint of the multi-angle notch, and that the overall centerline length of the tube remains unchanged.
FIG. 8A is a perspective view of one notched end of the workpiece of FIG. 8.
Figure 9:
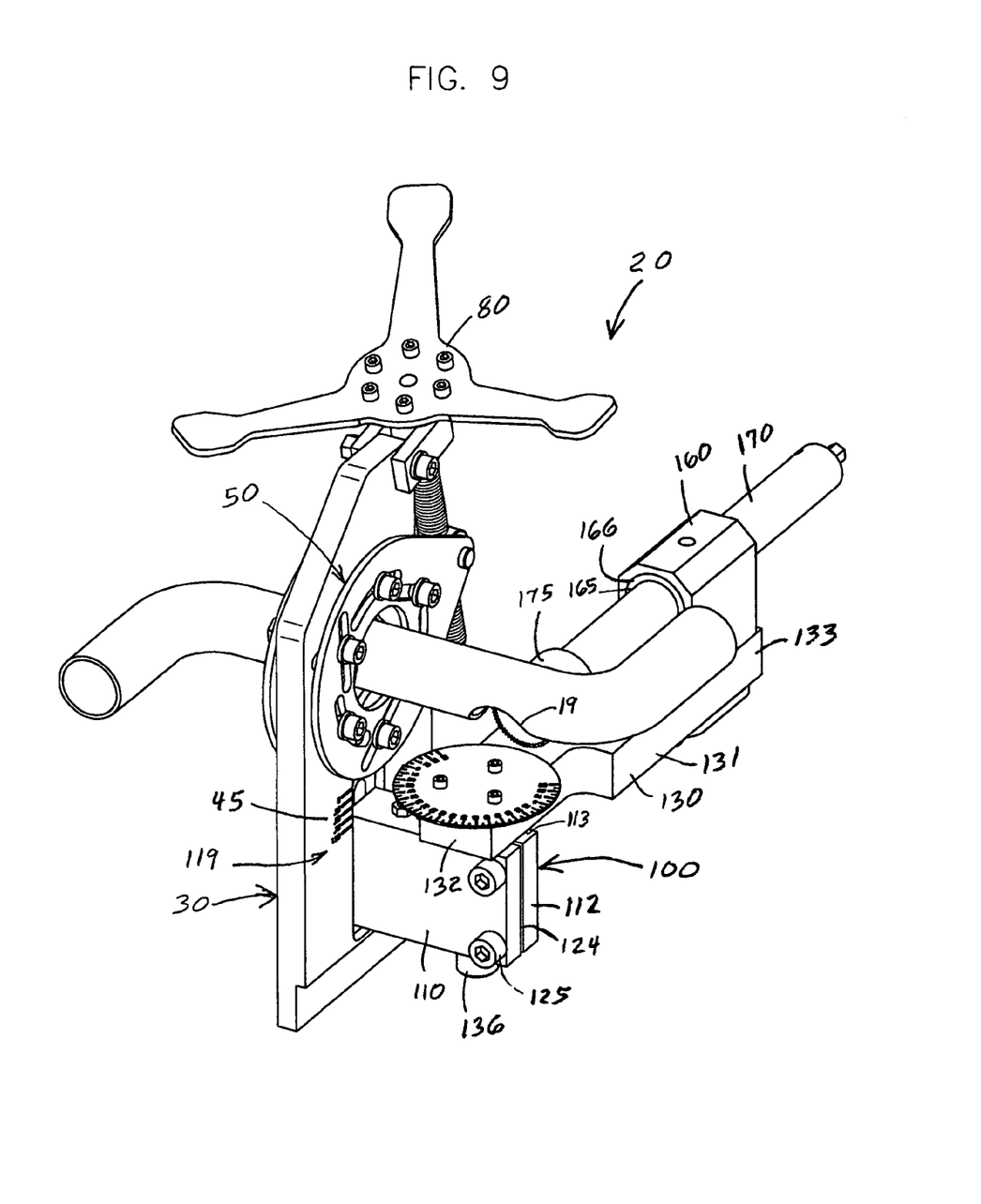
FIG. 9 is a perspective view showing the pivot block in a lowered or offset position to form an offset notch in the tubular workpiece.

The elongated tubular workpiece 5 will have a notch 10 formed in one or both of its ends. When the notch 10 is being cut, the notch has leading 11, middle 12 and trailing edges 13 and a radial centerline that define its shape or geometry. Notches 10 can have a variety of shapes or geometries. The notch 10 can be a cut normal to the longitudinal centerline 8 of the workpiece 5 as shown in FIG. 1. This type of normal notch 16 is commonly referred to as right angle or 0° degree angle notch. The notch 10 can also be angled relative to normal, such as the angled notch 17 shown in FIGS. 7 and 7A. The radius of the notch 10 is the same as the radius of the hole saw as it moves through the workpiece 5. The radial centerline of the notch is the linear path of the center of the hole saw as it forms the notch 10. Angling the path of the hole saw through the workpiece 5 elongates the notch 17 and alters its overall shape. Still, the edge forming the exact middle 12 of the notch 10 has the same general shape independent of the angle of the notch 16 or 17. This middle edge 12 defines the radial midpoint 15 of the notch 16 or 17. The radial middle 15 is located at the centerline 8 of the tube 5 for a hemispherical notch 10. As explained below, notch can also have multiple cuts such as the double angled notch 18 shown in FIGS. 8 and 8A. The centerline of the notch 10 can also be offset from the centerline 8 of the tube 5 to from an offset notch 19 as shown in FIG. 9.

The hole saw tube notcher shown in FIGS. 1-9 is generally referred to by reference number 20. The tube notcher 20 has a front, a rear, sides, a top and a bottom. The tube notcher 20 is comprised of several components secured to a metal base plate 30 that forms its frame 30. The base plate or frame 30 rigidly secures and rigidly joins these components together. The plate 30 is robustly designed to support a workpiece 5 and working loads placed on the notcher 20 during use. The solid metal base plate 30 has a thickness of about ¾ inch as defined by its generally flat front and rear surfaces, a width of about six inches and a height of about 14 inches. While the frame 30 is shown and described in a compact and economical form, it should be understood that the base plate or frame could take on a variety of solid structural shapes without departing from the broad aspects of the invention.

Figure 5:
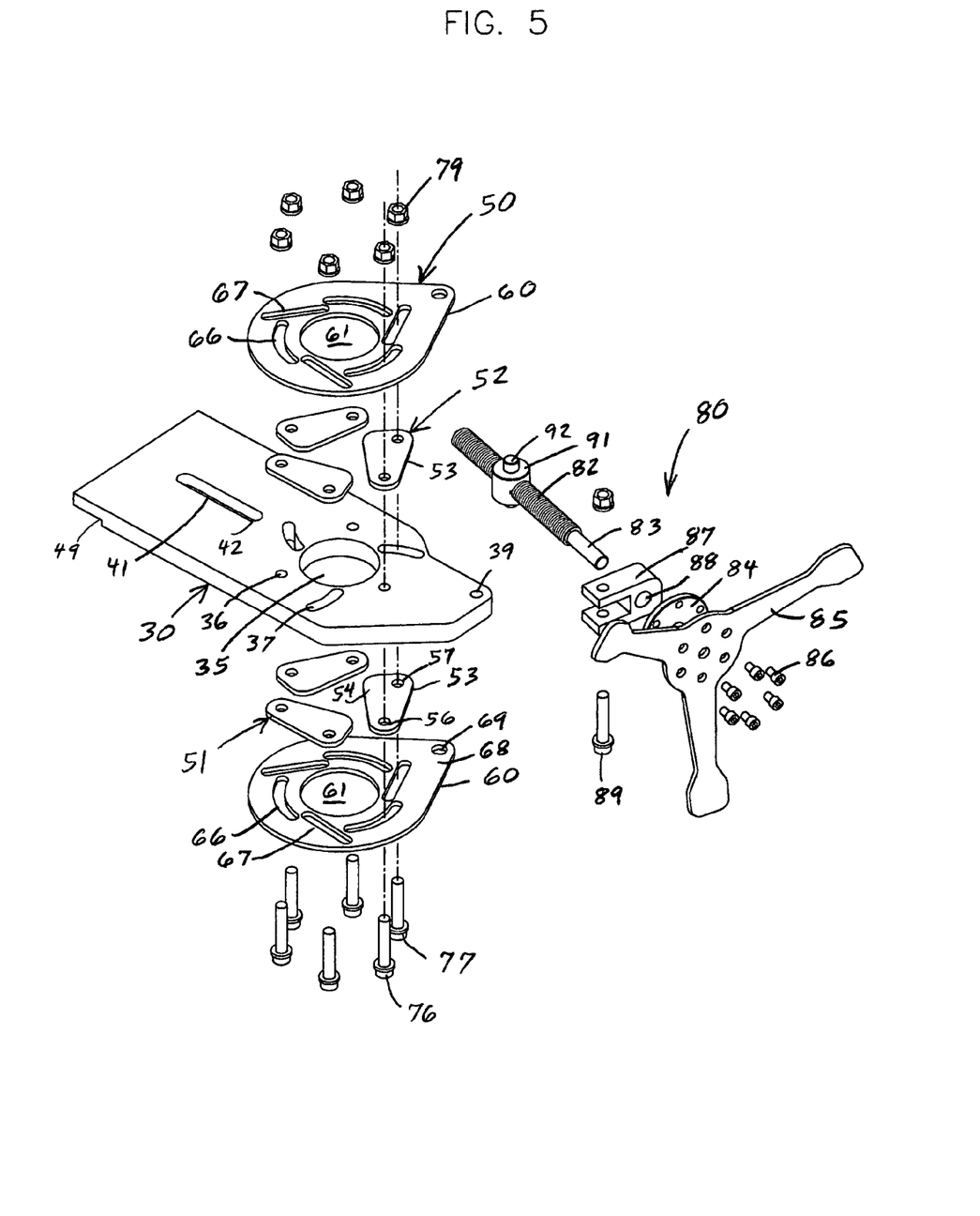
FIG. 5 is an exploded view of the base plate, rotary vice and vice drive mechanism.

The upper portion of the plate 30 has a circular opening as best shown in FIG. 5. The circular opening 31 has a center, is about three inches in diameter. The opening 31 is completely surrounded by the plate 30 for structural rigidity. Positioned around this opening 35 are three uniformly spaced pivot holes 36 and three uniformly spaced rotation slots 37. Each pivot hole is 120° from its adjacent pivot holes, and each pivot slot being 120° from its adjacent pivot slots. Each pivot hole 36 has a corresponding pivot slot 37 that is radially arced about that pivot hole. Each pivot hole 36 is located the same radial distance from the center of the circular opening 35, and each pivot slot 37 is located the same radial distance from the center of the circular opening 35. Each pivot slot 37 extends in a generally radial manner from the center of the opening 35. A securement hole 39 is located toward a top side corner of the plate 30. These holes and slots 35, 36, 37 and 39 pass completely through the plate 30.

The lower portion of the plate 30 has a linear vertical slot 41 with a length of about three inches. The vertical slot 41 is positioned directly below the circular opening 35, with the centerline of the slot 41 intersecting the center of the opening 35. The slot 41 passes completely through the plate 30. The slot has an upper end 42. A larger guide groove 44 is machined into the front surface 31 of the plate 30. The surface of the groove 44 is machined flat and smooth to allow sliding movement, and the vertical sides of the guide groove 44 are equidistant from the centerline of the slot 41 to form a guide track for positioning a pivot block on the plate 30 and with its circular opening 35 as discussed below. A vertical ruler or scale 45 is located adjacent the top of the slot 41 and groove 44. The zero point of the scale 45 is horizontally aligned with the upper end 42 of the slot 41. In this embodiment, the range of vertical motion of the pivot block 30 is about one inch, so that a notch can be formed into a workpiece 5 with the centerline and radial middle 15 of the notch 10 being offset from the centerline of the workpiece up to one inch.

The bottom edge of the plate 30 has a uniform depth horizontal groove 49. This groove 49 allows the plate to be leveled when secured in a conventional fixed plate vice on a workbench. Holes (not shown) are also machined into the lower end of the plate 30 to allow the plate to be firmly secured to a work bench.

A dual grip rotary vice assembly 50 is rotatably secured to the base plate 30 around circular opening 35. The rotary vice assembly 50 includes two sets of grippers 51 and 52, each set including three uniformly shaped gripper plates 53. A first set 51 of gripper plates 53 is located on the front of the base plate 30, and a second set 52 of gripper plates 53 is located on the rear of the base plate. Each gripper or jaw 53 has a thickness of about ¼ inch defined by opposed flat and smooth surfaces. The gripper plates 53 are flush against their corresponding surface of the plate 30 so that the two sets of grippers 51 and 52 are space apart a distance equal to the ¾ inch thickness of the plate 30. Each gripper plate has a length of about three inches, and narrower portion at one end and a wider portion at the other. Each gripper has two holes 56 and 57. A first pivot hole 56 is located through the narrower portion of the gripper 53. A second drive hole 57 is located through the wider portion of the gripper 53 proximal one side of the gripper so that the gripper is asymmetrical about its two holes with a tube engaging portion 54 extending from one side of the gripper. Each set 51 and 52 of grippers 53 is in registry with the other. The grippers 53 are uniformly spaced both rotationally around circular opening 35 and radially from the center of opening 35 so that the tube engaging portions 54 of the two sets 51 and 52 of grippers form a working centerline 58 for the vice 50 that passes through the center of the opening 35.

The dual grip rotary vice assembly 50 has a rotary drive assembly 59 with two rotary plates 60, each being a mirror image of the other. Each rotary or actuator plate 60 includes a circular opening 61 with a center and a diameter about equal to the three inches diameter of the opening 61 in plate 30. One rotary plate 60 is placed over one set 51 or 52 of gripper plates 53 on each side of the plate 30. The rotary plates 60 are aligned in registry with each other and with the circular opening 35 so that the centers of openings 61 and 35 form a common vice centerline 62 that is co-linear with the working centerline 58 of the spaced sets 51 and 52 of grippers 53.

Positioned around the circular opening 61 of each plate 60 are three uniformly spaced arced rotation slots 66 and three uniformly spaced linear drive slots 67. The start end of each arced rotation slot is 120° from the start end of its adjacent arced rotation slots, and the start end of each linear drive slot is 120° from the start end of its adjacent linear drive slots. Each arced rotation slot 66 is arced about the center 62 of the opening 61. Each arced rotation slot 66 has a corresponding linear drive slot 67. Each arced rotation slot 66 is located the same radial distance from the center of the circular opening 61, and each linear drive slot 67 is located the same radial distance from the center of the circular opening 61. Each linear drive slot 67 extends in a somewhat radial manner from the center 62 of the opening 61. The rotary plates 60 have an extended torque generating portion 68 with a drive hole 69.

Figure 4:
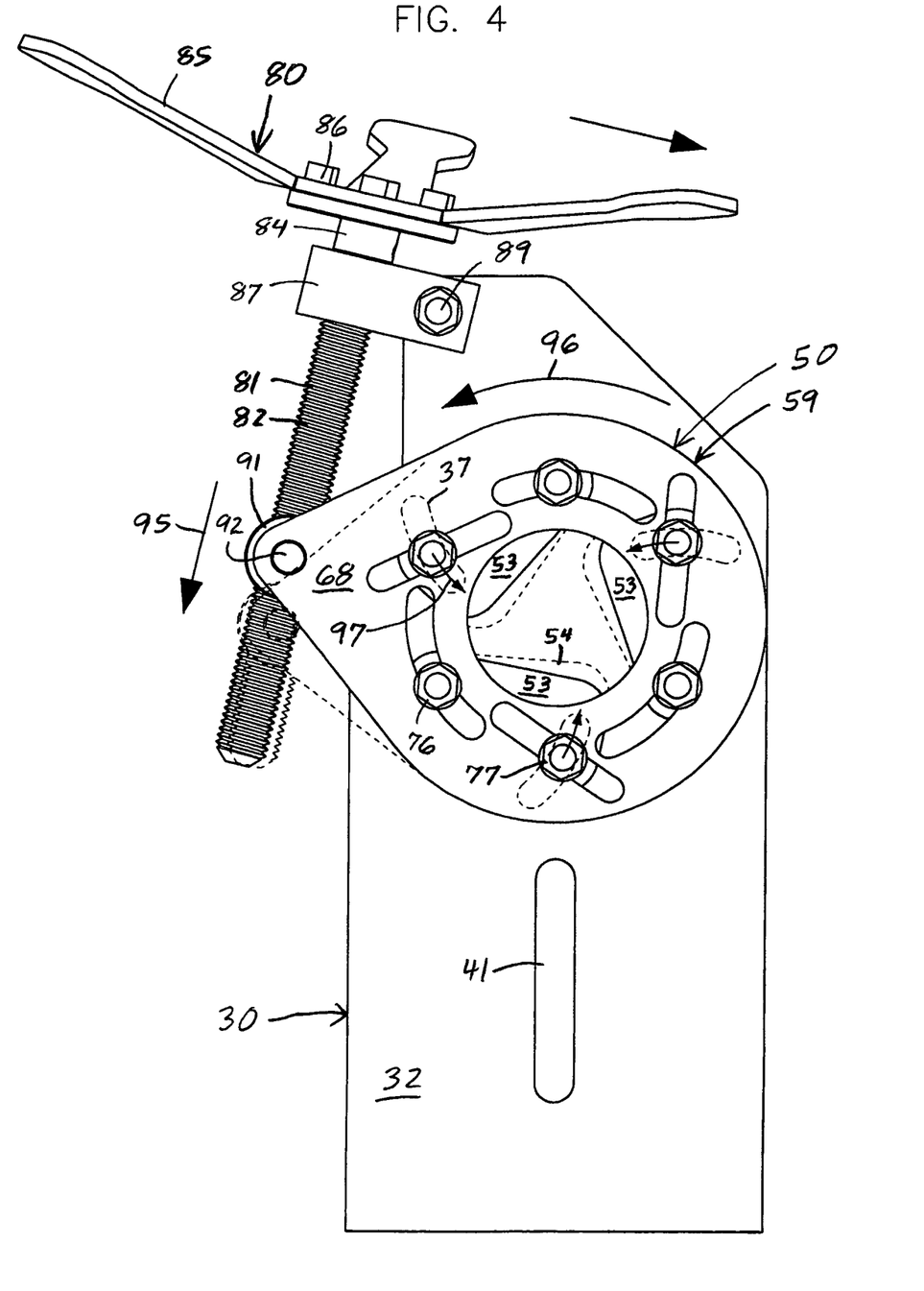
FIG. 4 is an enlarged front side plan view of the rotary vice showing the relative movements of the hand wheel, drive coupling, rotary plates, drive bolts and grippers or jaws when closing to grip and hold a tubular workpiece.

A set of three pivot bolts 76 and set of three drive bolts 77 operably join the rotation plates 60 to the two sets 51 and 52 of grippers 53 as is best shown by FIGS. 4 and 5. Each pivot bolt 76 passes through one plate pivot hole 36, a corresponding gripper pivot hole 56, and both corresponding rotary plate rotation slots 66. Each drive bolt 77 passes through one plate pivot slot 37, a corresponding gripper drive hole 57, and both corresponding rotary plate drive slots 67. Lock nut fasteners 79 on the ends of the bolts 76 and 77 hold the grippers 53, rotation plates 60 and bolts 76 and 77 together. The lock nuts 79 hold the components together loosely to allow rotating movement of the rotation plates 60 with respect to the base plate 30 and pined gripper plates 53. The lock nuts 79 are tightened to a point where they compress the rotary plates 60 and grippers 53 against the base plate 30, and are then backed off about a half turn to achieve a secure and rotatably loose fit. During use, the components form the rotary vice assembly 50 tighten up when gripping a workpiece 5 so that the working centerline 58 of the grippers 53 properly aligns the workpiece centerline with the vice centerline 62.

A vice drive mechanism 80 works in cooperation with the rotary drive assembly 59. The drive mechanism 80 includes a drive rod 81 with a threaded portion 82 and a smooth, non-threaded portion 83. An end bracket 84 is shrink fit or otherwise secured to the smooth portion 83, and a hand wheel 85 is secured to the end bracket via screws 86. A mounting bracket 87 rotatably holds the smooth portion 83 of the drive rod 81 so that the drive rod 81 is free to rotate with the hand wheel 85. This bracket 87 is pivotally secured to the mounting hole 39 located at the upper side corner of the base plate 30. A threaded drive coupling 91 is in threaded engagement with the threaded portion 82 of the drive rod 81. The drive coupling 91 includes two opposed nubs 92 that pivotally engage the drive holes 69 of the rotary plates 60 so that the drive coupling does not rotate with the threaded drive shaft 81. Thus, as shown in FIG. 4, rotation of the hand wheel causes drive coupling 91 to move along a path of travel 95 down the threaded shaft 81, which imparts rotational movement 96 to the rotary plates 60, and inward radial movement 97 of the drive bolts 77 and a corresponding inward pivoting movement of the gripper plates 53. This inward pivoting movement of the gripper plates 53 causes their tube engaging portions 54 to simultaneously move in aligned unison toward the center 58 and 62 of the rotary vice 50. This simultaneous aligned movement of the grippers 53 moves them into an aligned gripping engagement with the tubular workpiece 5 so as to align the centerline 8 of the workpiece 5 with the working centerline of the grippers 53 and the common centerline 62 of base openings 35 and rotary plate openings 61 of the vice 50. In this embodiment of the tube notcher 20, the range of motion of the rotary vice 50 and grippers 53 is about one to three inches, so that the vice can hold any tubular workpiece 5 between about one to three inches in diameter. Still, it should be understood by those skilled in the art that the range of the vice can be increased or decreased without departing from the broad aspects of the invention.

Figure 2:
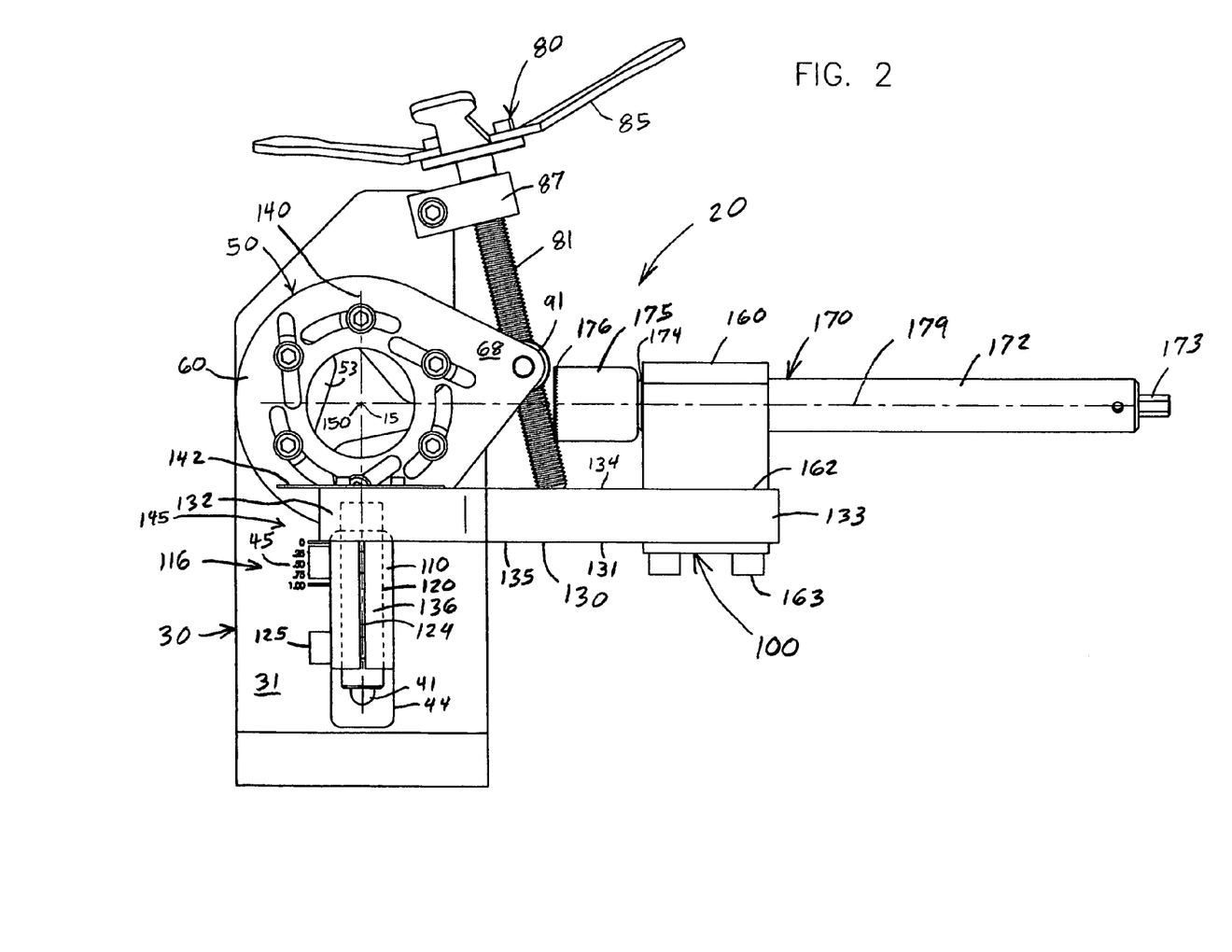
FIG. 2 is a front side plan view of the hole saw tube notcher showing the fixed intersecting alignment of the axis of rotation of the rotating arm with the vice centerline, and showing the pivot block in its normal or uppermost position so that the vice and hole saw centerlines are coplanar.

A hole saw alignment assembly 100 is secured to the vertical slot 41 of the plate 30. This securement is preferably achieved by a vertically slidable pivot block 110 to allow height adjustments of the hole saw relative to the rotary vice 50 and tubular workpiece 5. The pivot block 110 is about 4½ inches long, 3 inches tall and 1½ inches wide. The block 110 has inner and outer end surfaces 111 and 112. Its upper surface 113 is normal to its inner surface 111. The inner surface 111 is flat to flushly and slidably engages the flat vertical surface of the groove 44 formed around slot 41. The pivot block 110 is firmly secured to the base plate 30 by two bolts 114 that pass through the slot 41 and into the inner end of the block. The width of the pivot block 110 is about equal to the width of the groove 44 so that the sides of the pivot block flushly and slidably engage the vertical sides of the groove. This flush sliding engagement allows the pivot block to slide up and down in the groove to a desired height location as indicated by scale 45, and then be firmly secured to the base plate 30 by the bolts 114. The upper bolt 114 is located to engage the upper end of the vertical slot 41 to form an upper limit stop. When block 110 is positioned at its upper limit stop, the scale 45 indicates a 0 inch height adjustment, which is the normal or in-line position 116 of the alignment assembly 100 as shown in FIGS. 1 and 2. The pivot block 110 can be side down from this in-line position 116 to a desired offset position 119 as in FIG. 9. As noted above, in this embodiment, the range of height adjusting movement is preferably about one inch.

A hole 120 for receiving a pin is drilled or otherwise formed into the pivot block 110. The hole 120 is normal to the upper surface 112 of the block 110 so that it is parallel to the base plate 30 and perpendicular to the centerline 62 of the rotary vice 50. The hole 120 is located a desired distance from the plate 30 and rotary vice 50, and proximal the outer end 112 of the block 110. The hole 120 has a diameter slightly larger than the diameter of its corresponding pin 131, as discussed below. The outer end 112 of the block 110 is cut to form a gap 124 that split its outer end in two. The gap 124 is deep enough to at least reach the pivot hole 120. A pair of clamping bolts 125 located toward the end of the block 110 and passing through the gap 124 are tightened and loosened to control the size of the gap 124, and thus the diameter of the hole 120. In this embodiment, the hole 120 and axis of rotation 140 are about three inches from the front of plate 30.

A rotatable arm 130 is rotatably secured to the upper surface 113 of pivot block 110. The arm 130 is formed by an elongated rigid metal plate 131 with opposed fixed and free ends 132 and 133, and generally flat and parallel, upper and lower surfaces 134 and 135. The lower surface 135 of the fixed end 132 engages the upper surface 113 of the pivot block 110. A pivot pin 136 is shrink fit or otherwise rigidly secured to the fixed end 132 of the plate 131. The pin 136 extends from its lower surface 136 and into the hole 120 of pivot block 110 to form an axis of rotation 140 for the arm 130. The axis of rotation 140 of the arm 130 intersects the centerline 62 of the rotary vice 50 as shown in FIGS. 1, 2 and 6.

The arm 130 is selectively rotatable about its axis of rotation 140 through a range of angular positions. The clamping bolts 125 of the pivot block 110 are loosened to allow the rotation of arm 130, and tightened to secure the arm to a desired angular position when a notch is being cut into the workpiece 5. A rotation dial 142 is secured to the upper surface 138 of the plate 131. The center of the dial 142 is linearly aligned with the center of the pin 136 and the axis of rotation 140 of arm 130. This dial allows a worker to easily set the arm 130 to a desired position. As best shown in FIG. 6, a pointer 143 indicates the angle of the notch being cut.

Figure 6:
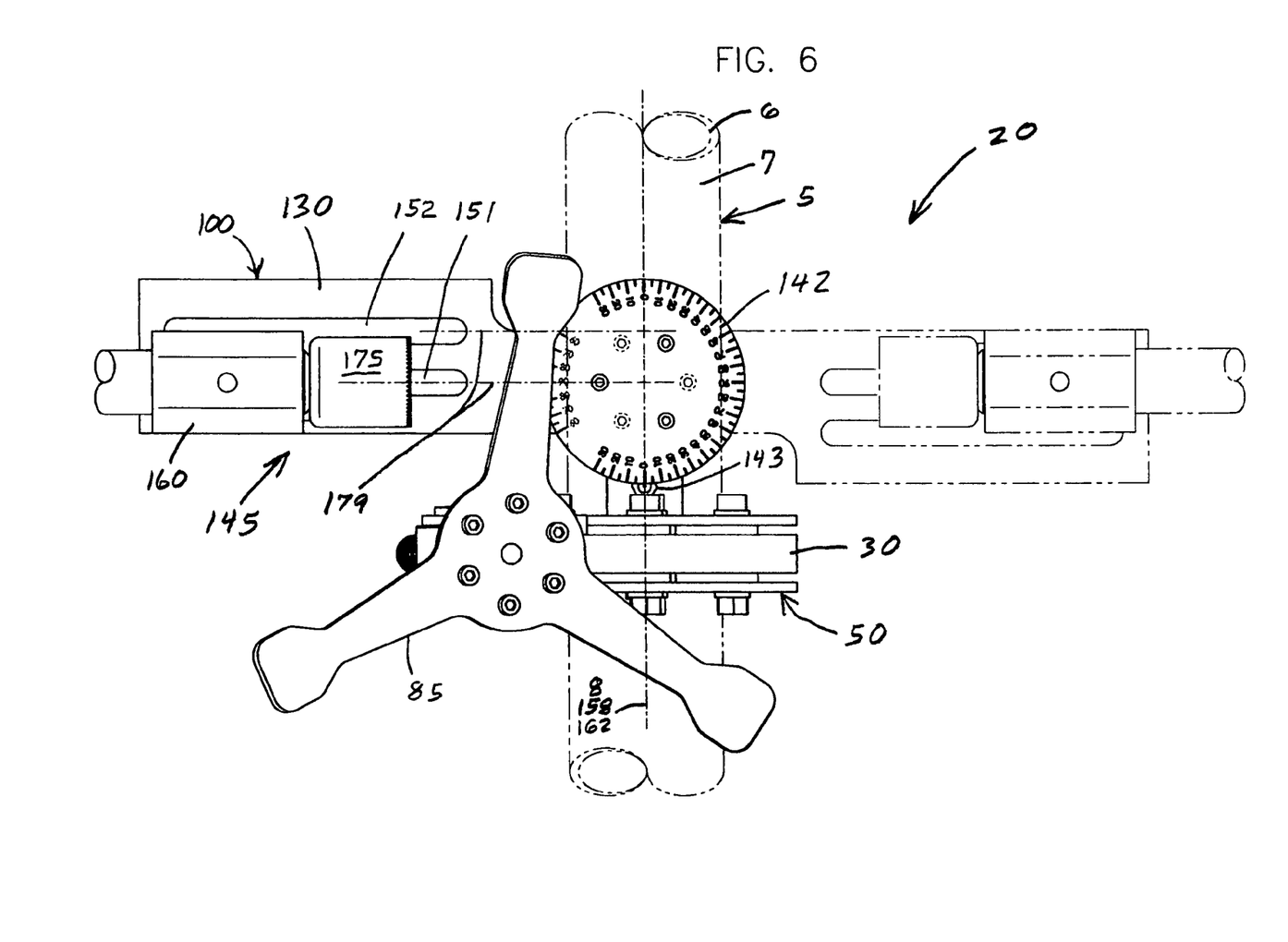
FIG. 6 is a top view of the hole saw tube notcher showing the in-line alignment of the saw centerline with the axis of rotation of the rotatable arm, and the intersecting alignment of the saw centerline with the vice centerline independent of the aligning slot used, and further showing the rotatable arm and hole saw in a first position normal to the workpiece centerline and a second rotated position after rotating the arm through 180° of rotation.
Figures 7, 7A:
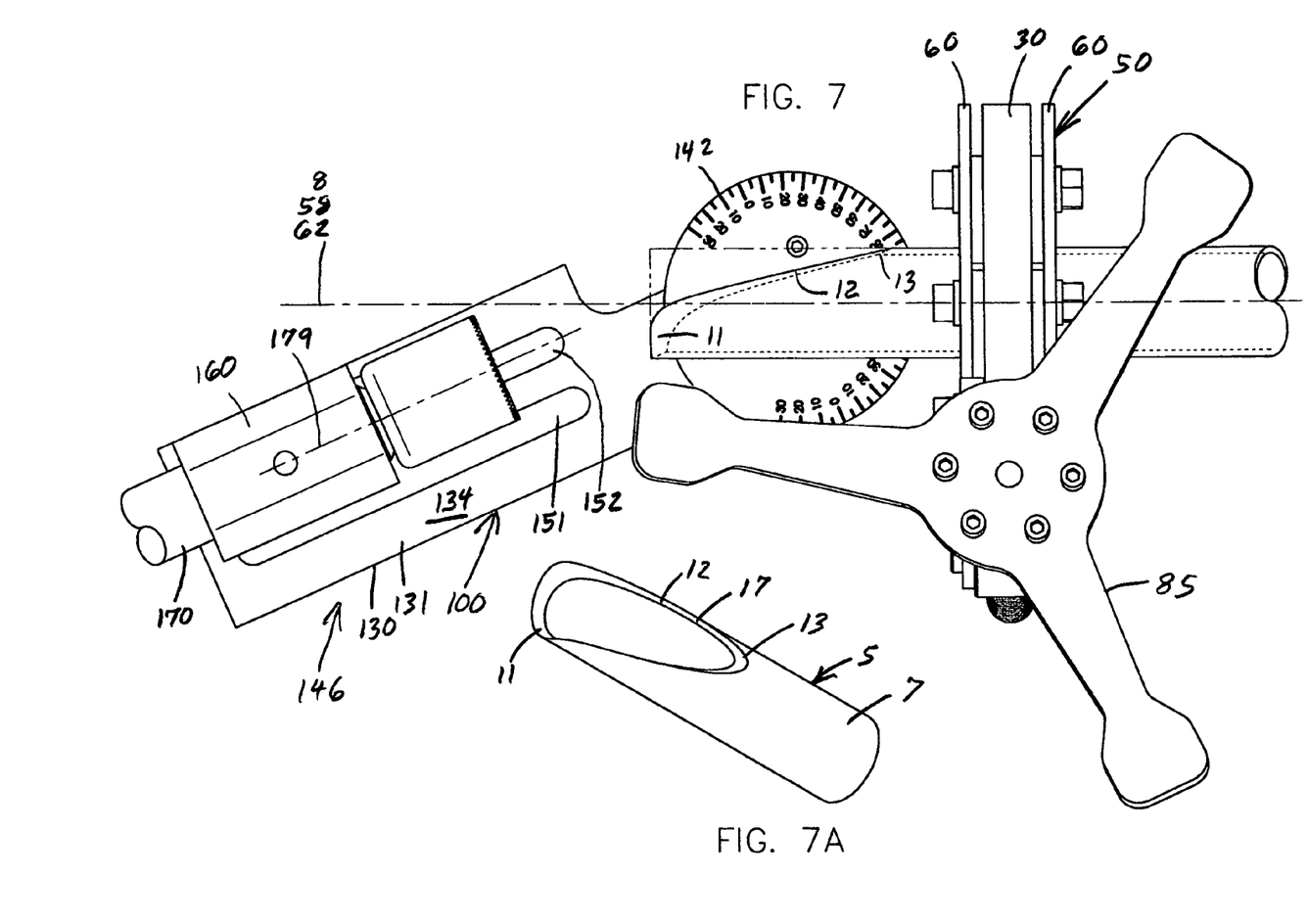
FIG. 7 is a top view of the hole saw tube notcher with the rotatable arm rotated to form a 67° angle notch, and with the saw secured to the offset slot of the rotatable arm so that the saw blade does not damage the vice when completing the cut.
FIG. 7A is a perspective view of one notched end of the workpiece of FIG. 7.

In the present embodiment, the arm 130 is rotatable through a range of about 240°, as best shown in FIG. 6. The arm 130 is rotatable from −30° angle position on one side of the vice 50 to a second −30° angle position on the opposite side of the vice, for a total rotation of 240°. The arm 130 is rotationally secured by tightening bolts 125 to a set notch forming angle. In FIG. 1, the arm is secured to a set notch forming angle 145 where the arm is normal to the workpiece 5. The pointer 143 is set to 0° on dial 142, and the tube notcher 20 cuts a normal or 90° angle 16 in the workpiece 5. In FIG. 7, the arm 130 is secured at set notch forming angle position 146, when the pointer 143 is set to 45° or 60° on the dial 42, so that the tube notcher 20 cuts an angled notch 17 into the workpiece 5 such as the 60° angle shown in FIGS. 7 and 7A. The arm 130 can also be secured to form a first notch forming angle to form a first notch portion of a multi-angle notch 18 as in FIGS. 8 and 8A. Bolts 125 are then loosened and the arm 130 is rotated to and secured at a second notch forming angle to form a second notch portion of the multi-angle notch 18, such as the double 45° angled notch 18 shown in FIGS. 8 and 8A.

The axis of rotation 140 is aligned to intersect the common centerline 8, 58 and 62 of the workpiece 5 and vice 50. This intersection occurs at a fixed point or common point of intersection 150. In this embodiment, the hole 120, axis of rotation 140 and fixed point of intersection 150 are about three inches from the front of base plate 30. Still, it should be understood to those of skill in the art that this dimension could be increased without departing from the broader aspects of the invention. In fact, it is contemplated that a selectively extendable pivot block 110 could be employed to allow a range of set locations for the axis of rotation 140 and common point of intersection or fixed point 150.

The plate 131 has two linear slots 151 and 152. Each elongated slot 151 or 152 is used to independently align and secure an arbor mount 160. The centerline of the first slot 151 is linearly aligned with the center of the pivot pin 136 so that the centerline of the slot 151 intersects the axis of rotation 140 of the arm 130 as shown in FIG. 6. The mount 160 has a flat bottom surface 162 that flushly engages the upper surface of the 134 of the plate 131. The mount 160 is securely bolted to the plate 135 by a pair of spaced bolts 163 that pass through one of the slots 151 or 152. The mount 160 has an elongated bored hole 165 with a tubular bearing 166 to slidingly hold and align a selectively rotatable arbor 170. The rotatable arbor 170 has an elongated shaft 172 with an end 173 for securing a source of rotational power such as a power drill, and a head 174 for securing a hole saw 175 with a tubular or ring-like blade 176. The hole 165 of the mount 160 is sized to flushly and slidingly receive and align the shaft 172 of the arbor 170.

Figure 2A:
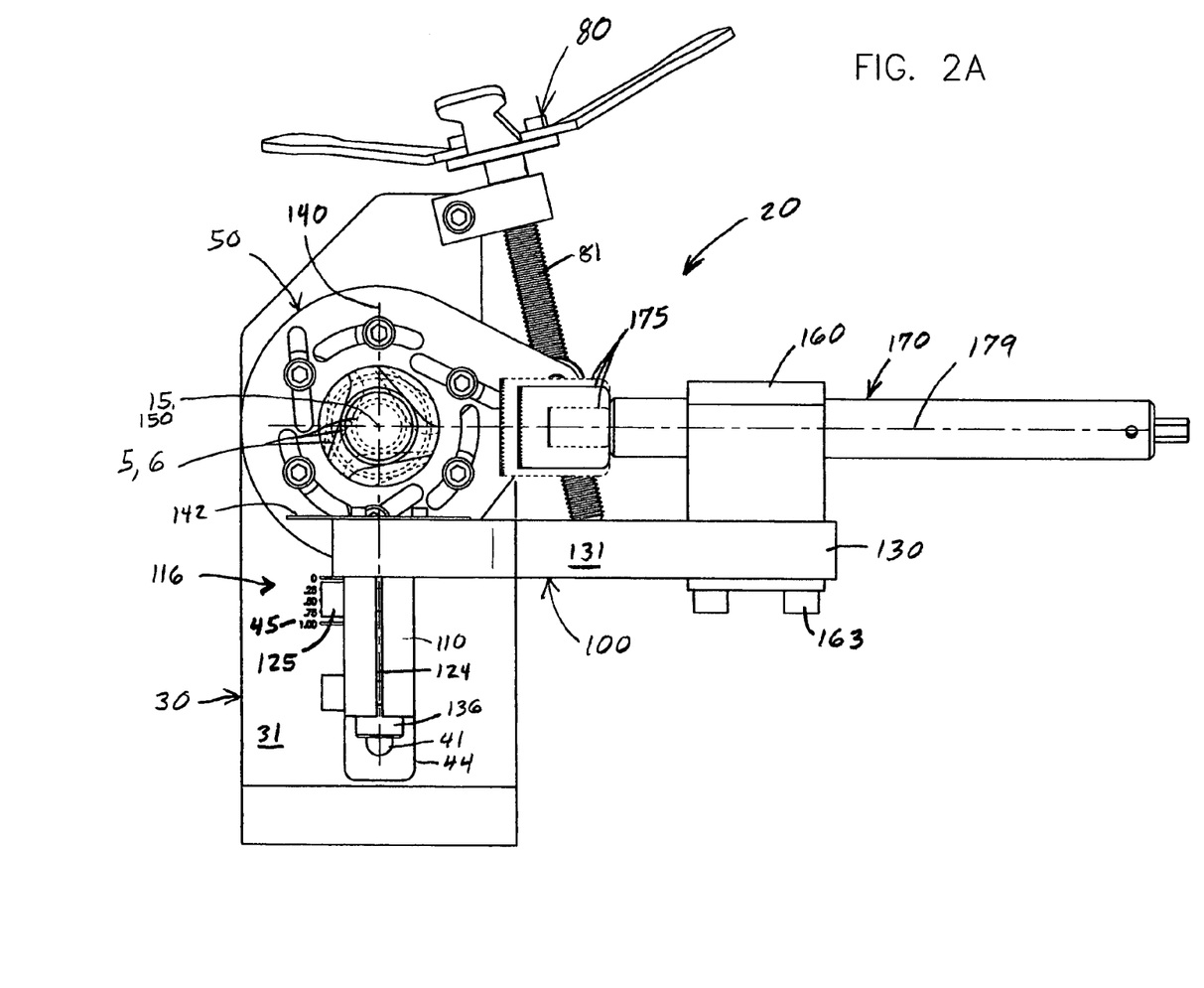
FIG. 2A is a front side plan view of the hole saw tube notcher of FIG. 2 and showing workpieces of varying diameter secured to the rotary vice, and hole saws of varying diameter secured to the saw arbor, while maintaining the saw centerlines in set notch forming alignment with the vice and workpiece centerlines.
Figure 3:
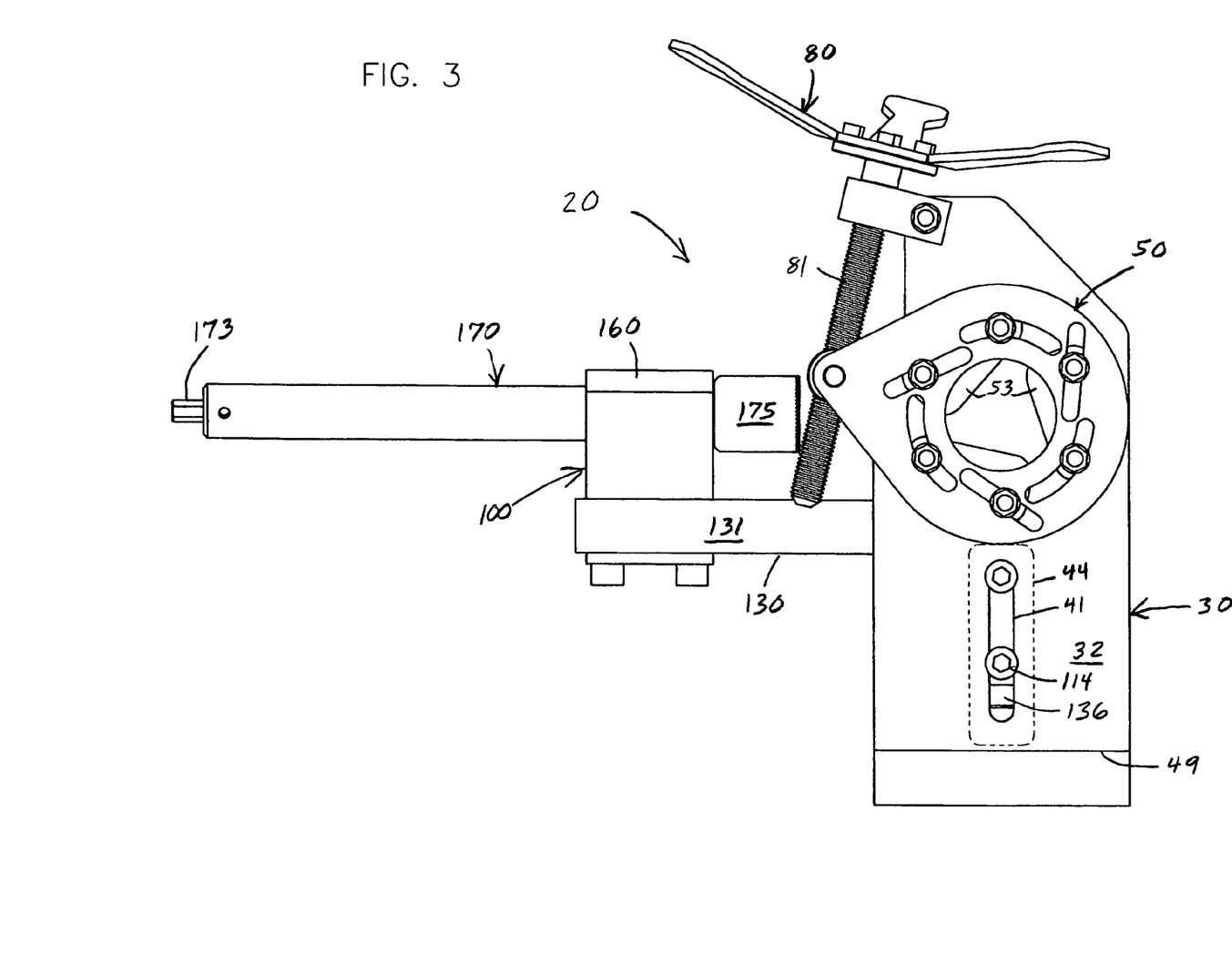
FIG. 3 is a rear side plan view of the hole saw tube notcher shown in FIG. 2.

The rotatable arbor 170 is slidable along a linear path 177 toward and away from the workpiece 5 passing through rotation axis 140 to engage, cut and form the notch 10 in the workpiece. When the mount 160 is secured to slot 151, the centerline 179 of the mount hole 165, arbor shaft 172 and hole saw 175 are in-line with and intersect the rotation axis 140. When the pivot block 110 is set to its normal upper position 116, the centerline 179 is co-planar with and intersects the common workpiece and vice centerlines 8, 58 and 62, and also intersects the point of common intersection or fixed point 150 as in FIGS. 1, 8 and 8A. When in this normal position 116, the tube notcher 20 forms normal notches 16, angled notches 17 or multi-angled notches 18. In this normal position 116, the fixed point 150 remains fixed on the radial midpoint 15 of the notch 10 formed by the hole saw 175 in the workpiece 5 independent of the set notch forming angle 145 or 146 of said rotatable arm 130. The fixed point 150 also remains fixed on the radial midpoint 15 of the notch 10 independent of the diameter of the workpiece 5 and independent of the diameter of the hole saw 175 as best shown in FIG. 2A.

Lowering the pivot block 110 to an offset position 119 will form an offset notch 19 as in FIG. 9. Lowering the pivot block 110 lowers or offsets the centerline 179 of the of the mount hole 165, arbor shaft 172 and hole saw 175 from the fixed centerline 58, 62 of the workpiece 5 and vice 50 while maintain the planar relationship between these centerlines 58, 62 and 179. When in this lower offset position 119, the fixed point 150 still remains fixed on the radial midpoint 15 of the notch 10 formed by the hole saw 175 independent of the set notch forming angle 145 or 146 of said rotatable arm 130. The fixed point 150 also remains fixed on the radial midpoint 15 of the notch 10 independent of the diameter of the workpiece 5 and independent of the diameter of the hole saw 175.

The second slot 152 is offset from and parallel to the pin 131 about one inch. This offset allows the tube notcher 20 to form high angle notches as in FIGS. 7 and 7A while keeping the length of the arm 130 to a minimum. Without this offset slot 152, the length of the arm 130 would have to be extended to prevent the blade 176 of the hole saw 175 from striking the vice 50 when trying to complete a high angle notch. When the hole saw 175 is offset on slot 152, the fixed point 150 will not remain fixed on the radial middle 15 of the notch independent of the set notch forming angle of said rotatable arm 130.

Although the rotary vice 50 is shown and described as being above the location of securement 41 for the hole saw alignment assembly 100, it should be understood that the orientation of the vice and mounting assembly could be altered without departing from the broad aspects of the invention. While the invention has been described with reference to a preferred embodiment, it will be understood by those skilled in the art that various changes may be made and equivalents may be substituted without departing from the broader aspects of the invention.

I claim:

1. A hole saw tube notcher adapted for use with conventional hole saws and a source of rotational power, each hole saw having a saw centerline and given diameter, said hole saw tube notcher being further adapted to form radial notches in elongated tubular workpieces, each workpiece having a workpiece centerline and given diameter, said hole saw tube notcher comprising:
a rotary vice with at least three movable grippers that define a vice centerline, said at least three grippers being selectively movable to grip and hold one elongated tubular workpiece with its workpiece centerline in substantially co-linear alignment with said vice centerline;
a saw alignment assembly having a rotatable arm with a saw mount that rotatably holds an arbor, said arbor having a first end adapted to hold one of the hole saws and a second end adapted to drivingly connect the source of rotational power, said arbor being slidably held by said saw mount to allow the hole saw to move linearly along a path of travel toward the workpiece, and said arm being selectively rotatable about an axis of rotation through a range of angular positions, said saw mount positioning the saw centerline in intersecting alignment with said axis of rotation; and,
a solid structure with portions that rigidly join said rotary vice and saw alignment assembly, said solid structure fixing said arm axis of rotation in intersecting normal alignment with said vice and hole saw centerlines at a fixed point located a predetermined distance from said rotary vice, said solid structure selectively holding said rotatable arm at a set notch forming angle when forming the notch in the workpiece.

2. The hole saw tube notcher of claim 1, and wherein the notch formed by the hole saw in the tubular workpiece has a radial midpoint, and said fixed point remains fixed on the radial midpoint independent of the set notch forming angle of said rotatable arm.

3. The hole saw tube notcher of claim 2, and wherein said fixed point remains fixed on the radial midpoint of the notch independent of the workpiece diameter and independent of the hole saw diameter.

4. The hole saw tube notcher of claim 1, and wherein said wherein the saw centerline is co-planar to said rotating vice centerline and in intersecting alignment with said fixed point.

5. The hole saw tube notcher of claim 4, and wherein said solid structure is a plate, and said rotatable arm is rotatably secured to a pivot block, and said pivot block is secured to said plate.

6. The hole saw tube notcher of claim 5, and wherein said plate and pivot block form an offset mechanism, said offset mechanism selectively moving said alignment assembly between an in-line position with the saw centerline co-planar to the workpiece centerline and an offset position with the saw centerline offset from the workpiece centerline, the hole saw forming an offset notch in the workpiece when in said offset position.

7. The hole saw tube notcher of claim 6, and wherein said offset mechanism includes a vertical slot in said plate below said rotary vice, said slot being linearly aligned with said vice centerline.

8. The hole saw tube notcher of claim 5, and wherein said rotatable arm is selectively secured to said pivot block along an axis of rotation spaced from said rotary vice a predetermined distance to allow said arm to rotate through 240° of rotation.

9. The hole saw tube notcher of claim 5, and wherein said solid plate has a central opening and said rotary vice has at least three grippers positioned around said central opening.

10. The hole saw tube notcher of claim 9, and wherein said rotary vice is a dual grip rotary vice, said dual grip rotary vice having first and second spaced apart rotary vices, each rotary vice having a rotation plate with a center opening and at least three grippers spaced around said center opening to define a center of said rotary vice; said centers of said first and second rotary vices defining said centerline of said dual grip rotary vice; each of said first and second rotary vices gripping the workpiece to align the workpiece centerline with said dual grip rotary vice centerline.

11. The hole saw tube notcher of claim 1, and wherein said rotating arm includes first and second slots for securing said saw mount, said first slot positioning said saw mount and saw centerline in intersecting alignment with said fixed point, and said second slot positioning said saw mount and saw centerline in an offset alignment with said fixed point to allow said arm to remain short in length which also allowing said tube notcher to form high angle notches.

12. A hole saw tube notcher adapted for use with conventional hole saws and a conventional hand-held power drill, each hole saw having a saw centerline and given diameter, said hole saw tube notcher being further adapted to form radial notches in elongated tubular workpieces, each workpiece having a workpiece centerline and given diameter, said hole saw tube notcher comprising:
a dual grip rotary vice assembly formed by a solid plate located between two sets of spaced apart grippers and a drive mechanism including two spaced rotary discs, said solid plate and rotary discs having interior openings held in registry to form a common opening with a common center, said spaced apart gripper sets being located radially from said common center and including at least three grippers to define an operable vice centerline, each set of grippers being located on an opposite side of said solid plate and between one of said rotary discs and said solid plate, said grippers being positioned uniformly around and extending partially into said common opening, said gripper drive mechanism being operable to uniformly rotate said rotary discs about said common center to uniformly move said grippers toward said common center and into spaced dual gripping engagement with the elongated tubular workpiece, said spaced dual gripping engagement aligning said workpiece centerline with said vice centerline; and,
a saw alignment assembly including a pivot block secured to said solid plate, a selectively rotatable arm and a sliding saw mount with first and second locations, said arm being selectively rotatable about an arm axis, said pivot block fixing said arm axis in intersecting normal alignment with said vice centerline at a fixed point located a predetermined distance from said plate, and said saw mount rotatably holding one of the hole saws at said first location and drivingly connecting to the drill at its said second location, said sliding saw mount positioning the saw centerline in intersecting alignment with said arm axis.

13. The hole saw tube notcher of claim 12, and wherein the notch formed by the hole saw in the tubular workpiece has a radial midpoint, and said fixed point remains fixed on the radial midpoint independent of the set notch forming angle of said rotatable arm.

14. The hole saw tube notcher of claim 12, and wherein said solid plate forms an opening with a center and a perimeter, and wherein a set of at least three gripper pivot holes and at least three gripper pivot slots are located through said plate around said perimeter; each gripper pivot hole having a corresponding arcuate gripper pivot slot, and each arcuate gripper pivot slot forming an arc about its said corresponding gripper pivot hole, and each rotary disc has an opening with a center and a perimeter, and a set of arcuate gripper pivot bolt slots, each gripper pivot bolt slot arcing about said center of its said disc, and a set of gripper drive bolt slots.

15. The hole saw tube notcher of claim 14, and wherein said dual grip rotary vice assembly further including a set of at least three gripper pivot bolts, a set of at least three gripper drive bolts, said grippers being pivotable about said gripper pivot bolts.

16. The hole saw tube notcher of claim 15, and wherein said gripper pivot holes are located uniformly around said perimeter of said plate opening and equidistant from its said center, and with each gripper pivot bolt passing through its corresponding gripper pivot bolt slots in said rotary discs.

17. The hole saw tube notcher of claim 12, and wherein said saw mount has a tubular opening and said arbor has an elongated shaft, said saw mount being fixed to said rotatable arm, said arbor shaft being flushly and slidingly received by said tubular opening, and said tubular opening, arbor shaft and the hole saw share a common centerline.

\* \* \* \* \*